US012617261B2

(12) United States Patent
Kuwahara et al.

(10) Patent No.: US 12,617,261 B2
(45) Date of Patent: May 5, 2026

(54) ELECTRIC VEHICLE

(71) Applicant: TOYOTA JIDOSHA KABUSHIKI KAISHA, Aichi-ken (JP)

(72) Inventors: Takeshi Kuwahara, Toyota (JP); Shinichiro Suenaga, Nagoya (JP); Shigeki Yamazaki, Anjo (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 299 days.

(21) Appl. No.: 18/439,952

(22) Filed: Feb. 13, 2024

(65) Prior Publication Data

US 2024/0270060 A1     Aug. 15, 2024

(30) Foreign Application Priority Data

Feb. 13, 2023     (JP) ................................. 2023-020345

(51) Int. Cl.
B60K 1/04 (2019.01)
B60L 50/60 (2019.01)
B62D 21/15 (2006.01)

(52) U.S. Cl.
CPC ................ B60K 1/04 (2013.01); B60L 50/60 (2019.02); B62D 21/15 (2013.01)

(58) Field of Classification Search
CPC . B60K 1/04; B60K 1/00; B60K 6/405; B60K 6/22; B60K 6/26; B60K 6/00; B60K 6/20; B60K 6/40; B62D 21/15; B62D 21/152; B62D 21/157; B60L 50/60; B60L 50/00
See application file for complete search history.

(56) References Cited

U.S. PATENT DOCUMENTS 5,042,321 A *   8/1991  Hongo .................... F16H 57/03
                                                    74/606 R
5,070,830 A *  12/1991  Malven .................. B60K 17/00
                                                    123/195 A
7,588,117 B2 *  9/2009  Fukuda ................ B62D 21/155
                                                    180/291
8,360,191 B2 *  1/2013  Ikeda ....................... B60K 5/12
                                                    180/300

(Continued)

FOREIGN PATENT DOCUMENTS

WO       2021/176602 A1     9/2021
WO       2021/176603 A1     9/2021

*Primary Examiner* — James M Dolak
(74) *Attorney, Agent, or Firm* — HAUPTMAN HAM, LLP

(57)     ABSTRACT

An electric vehicle includes: a side member; and a mechanical-electrical integrated unit attached to the side member through a fastener. The mechanical-electrical integrated unit is constituted by a drive apparatus and an electric-power control apparatus that are housed in a same casing. The casing has an upper space and a lower space that are vertically separated within the casing. The electric-power control apparatus is housed in the upper space while the drive apparatus is housed in the lower space. The fastener is attached to a fastened portion which is provided in a side wall of the casing and which is thicker than a surrounding portion surrounding the fastened portion. The side member includes a fragile portion that is located in a position overlapping the fastened portion as viewed in a width direction of the vehicle.

4 Claims, 8 Drawing Sheets

(56) References Cited

U.S. PATENT DOCUMENTS

| | | | | |
|---|---|---|---|---|
| 8,720,976 | B2 * | 5/2014 | Oyama ................ | B62D 25/082 |
| | | | | 296/187.09 |
| 9,061,713 | B2 * | 6/2015 | Hashimoto ............ | B62D 27/02 |
| 9,199,537 | B2 * | 12/2015 | Hotta ...................... | B60L 58/30 |
| 9,469,201 | B2 * | 10/2016 | Hotta ...................... | B60L 50/60 |
| 9,505,444 | B2 * | 11/2016 | Tsuchida .............. | B62D 25/082 |
| 10,598,268 | B2 * | 3/2020 | Nakajima ................ | B60K 1/02 |
| 12,191,730 | B2 * | 1/2025 | Asakura .............. | B62D 21/152 |
| 12,304,292 | B2 * | 5/2025 | Asakura ................... | B60K 1/00 |
| 2014/0245860 | A1 * | 9/2014 | Kimura ................ | F16H 57/025 |
| | | | | 74/606 R |
| 2023/0120938 | A1 | 4/2023 | Asakura et al. | |
| 2023/0163654 | A1 | 5/2023 | Asakura et al. | |

* cited by examiner

VERTICAL
DIRECTION

UP

LONGITUDINAL
DIRECTION

FRONT ◄———► REAR

DOWN

RIGHT   WIDTH DIRECTION

FRONT ◄———► REAR

LONGITUDINAL DIRECTION

LEFT

ELECTRIC VEHICLE

This application claims priority from Japanese Patent Application No. 2023-020345 filed on Feb. 13, 2023, the disclosure of which is herein incorporated by reference in its entirety.

FIELD OF THE INVENTION

The present invention relates to an electric vehicle provided with a mechanical-electrical integrated unit that is constituted by a drive apparatus and an electric-power control apparatus that are housed in a same casing, wherein the drive apparatus includes an electric motor functioning as a power source, while the electric-power control apparatus is configured to control an electric power transmitted and received by the electric motor.

BACKGROUND OF THE INVENTION

There is known a vehicle that includes a drive unit in which a drive apparatus including an electric motor functioning as a power source and an electric-power control apparatus including an inverter for controlling an electric power transmitted and received by the electric motor are accommodated in separate casings, respectively, and the separate casings are connected to each other through bolts or the like. For example, Patent Document 1 discloses such a vehicle. In the vehicle disclosed in Patent Document 1, the drive unit is attached to a side member through a fastener. The casing that houses the electric-power control apparatus is disposed in a position higher than the side member as viewed in a width direction of the vehicle.

PRIOR ART DOCUMENT

Patent Document

[Patent Document 1] WO 2021/176602

SUMMARY OF THE INVENTION

Where a height of the drive unit described in Patent Document 1 is reduced, the casing that houses the electric-power control apparatus may be located in a position that overlaps a fragile portion of the side member as viewed in the width direction. In this case, when the side member is bent or broken at the fragile portion due to a collision of the vehicle, there is a risk that the bent or broken side member may press the casing housing the electric-power control apparatus in the width direction. In the vehicle disclosed in Patent Document 1, a connection portion in which the separate casings are connected through the bolts or the like is broken or bent, so that energy of the bent or broken side member pressing the casing housing the electric-power control apparatus is absorbed. Thus, it is possible to suppress damage of the casing that houses the electric-power control apparatus, and to avoid exposure of the electric-power control apparatus applied with a high voltage to outside of the casing.

By the way, in order to simplify a shape of the drive unit, it might be possible to adopt an arrangement in which the drive apparatus and the electric-power control apparatus are housed in the same casing, for example, such that the electric-power control apparatus may be housed in an upper space in the same casing while the drive apparatus may be housed in a lower space in the same casing. In this arrangement, there is no portion for absorbing energy of the bent or broken side member pressing the casing in the upper space, and the casing may be damaged in the upper space. If the casing is damaged in the upper space, the electric-power control apparatus applied with a high voltage may be exposed to outside of the casing thereby causing risk of an electric leakage.

The present invention has been made in view of the above circumstances, and an object of the present invention is to provide an electric vehicle capable of preventing an electric-power control apparatus from being exposed to outside of a casing.

The present invention provides an electric vehicle including: a side member; and a mechanical-electrical integrated unit attached to the side member through a fastener. The mechanical-electrical integrated unit is constituted by a drive apparatus and an electric-power control apparatus that are housed in a same casing. The drive apparatus includes an electric motor functioning as a power source. The electric-power control apparatus is configured to control an electric power transmitted and received by the electric motor. The casing has an upper space and a lower space that are vertically separated within the casing. The electric-power control apparatus is housed in the upper space while the drive apparatus is housed in the lower space. The fastener is attached to a fastened portion which is provided in a side wall of the casing and which is thicker than a surrounding portion surrounding the fastened portion. The side member includes a fragile portion that is located in a position overlapping the fastened portion as viewed in a width direction of the electric vehicle.

In the electric vehicle of the present invention, (a) the casing has the upper space and the lower space that are vertically separated within the casing, (b) the electric-power control apparatus is housed in the upper space while the drive apparatus is housed in the lower space, (c) the fastener is attached to the fastened portion which is provided in the side wall of the casing and which is thicker than the surrounding portion surrounding the fastened portion, and (d) the side member includes the fragile portion that is located in the position overlapping the fastened portion as viewed in the width direction of the electric vehicle. When the side member of the electric vehicle is bent or broken at the fragile portion due to a collision of the vehicle, the bent or broken side member presses the casing in the width direction so as to break through the casing. However, in the present invention, the fragile portion of the side member is located in the position overlapping the fastened portion as viewed in the width direction, so that the strength of the portion of the casing pressed by the bent or broken side member is increased by the fastening portion, as compared to an arrangement in which the fragile portion is not located in the position overlapping the fastened portion. Thus, the casing is prevented from being pierced by the bent or broken side member, and hence the power control apparatus applied with a high voltage is prevented from being exposed to the outside of the casing, due to breakage of the casing, so that safety is easily ensured.

BRIEF DESCRIPTION OF THE DRAWINGS

FIG. 2 is a view showing an example of an electrical configuration of an electric-power control unit and the like;

FIG. 4A and FIG. 4B are views showing an example of a state in which the drive unit is installed in the hybrid electric vehicle, wherein FIG. 4A is a side view as seen a left side of the hybrid electric vehicle, and FIG. 4B is a top view as seen from above the hybrid electric vehicle;

DETAILED DESCRIPTION OF PREFERRED EMBODIMENT

Figure 1:
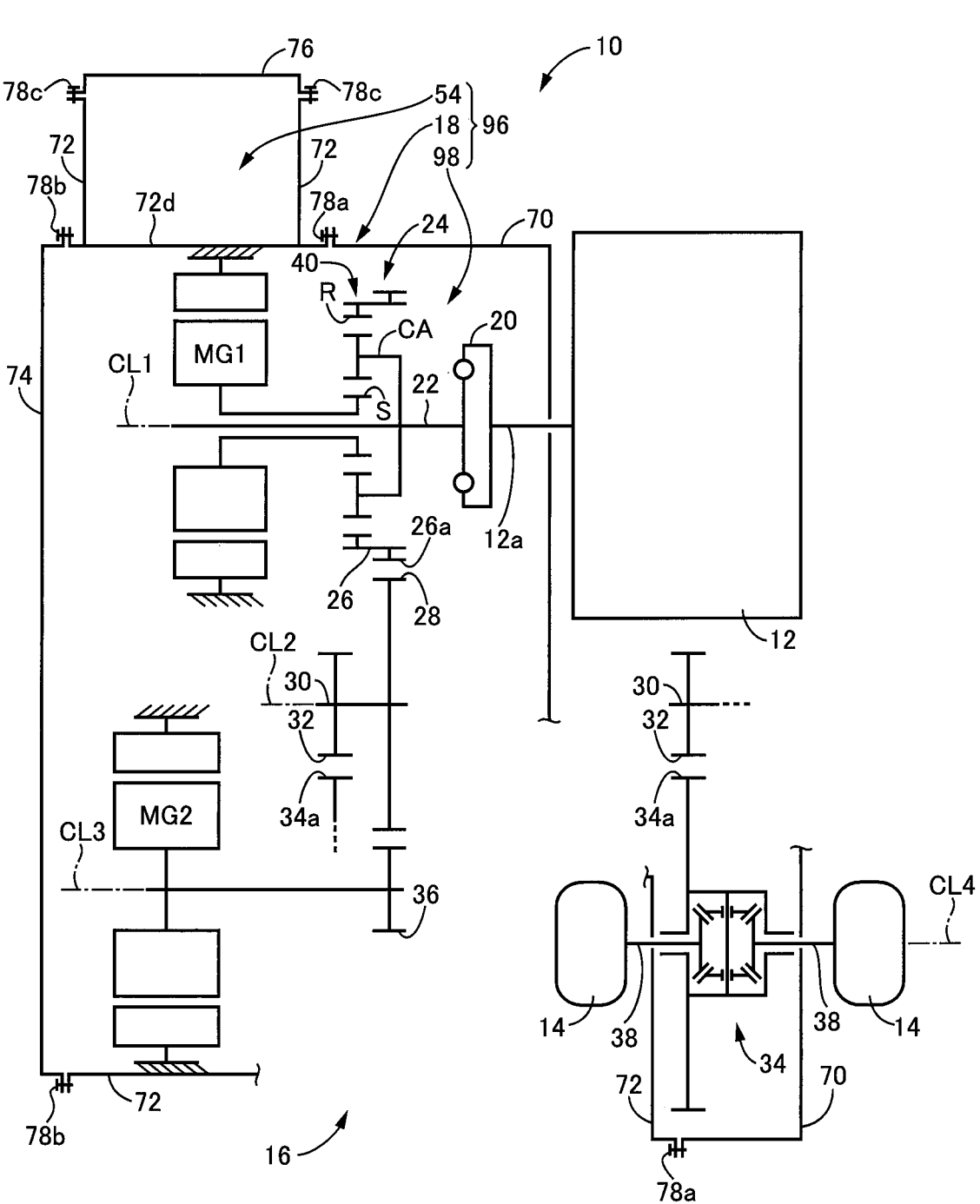
FIG. 1 is a view schematically showing, by way of example, a construction of a hybrid electric vehicle to which the present invention is applied.

Hereinafter, an embodiment of the present invention will be described in detail with reference to the drawings. In the drawings of the embodiment, the drawings are simplified or modified as appropriate, and the dimensional ratios, shapes, and the like of the respective parts are not necessarily accurately drawn.

EMBODIMENT

FIG. 1 is a view schematically showing, by way of example, a construction of a hybrid electric vehicle 10 (hereinafter, simply referred to as "vehicle 10") to which the present invention is applied. The vehicle 10 corresponds to an "electric vehicle" in the present invention.

The vehicle 10 includes an engine 12 that functions as a power source, and a first electric motor MG1 and a second electric motor MG2 that are electric motors that function as power sources. The vehicle 10 includes a pair of drive wheels 14 and a power transmission device 16.

The engine 12 is a known internal combustion engine. The first electric motor MG1 and the second electric motor MG2 are, for example, rotating electric machines having motor functions and power generator functions, and are so-called motor generators. The first electric motor MG1 and the second electric motor MG2 are accommodated in a non-rotatable casing 18 which is a non-rotatable member attached to a vehicle body that is a body of the vehicle 10. Each of the first electric motor MG1 and the second electric motor MG2 corresponds to an "electric motor" in the present invention.

The power transmission device 16 is provided in a power transmission path between the engine 12 and the pair of drive wheels 14 and in a power transmission path between the second electric motor MG2 and the pair of drive wheels 14. The power transmission device 16 includes a damper 20, an input shaft 22, a transmission portion 24, a composite gear 26, a driven gear 28, a driven shaft 30, a final gear 32, a differential gear device 34 and a reduction gear 36 that are disposed in the casing 18. The input shaft 22 functions as an input rotary member of the transmission portion 24, and is connected to a crankshaft 12a of the engine 12 through the damper 20, for example. The transmission portion 24 is connected to the input shaft 22. The composite gear 26 is an output rotary body of the transmission portion 24. The composite gear 26 has a drive gear 26a formed on a part of an outer peripheral surface thereof. The drive gear 26a is an output rotary member of the transmission portion 24. The driven gear 28 meshes with the drive gear 26a. The driven gear 28 and the final gear 32 are fixed to the driven shaft 30 so as not to be relatively rotatable. The final gear 32 has a smaller diameter than the driven gear 28 and meshes with a differential ring gear 34a of the differential gear device 34. The reduction gear 36 has a smaller diameter than the driven gear 28 and meshes with the driven gear 28. A rotor shaft of the second electric motor MG2 is connected to the reduction gear 36, and the second electric motor MG2 is connected to the reduction gear 36 in a power transmittable manner. The power transmission device 16 includes a pair of drive shafts 38 connected to the differential gear device 34.

The power transmission device 16 constructed as described above is suitably used for a vehicle of a front engine front drive (FF) type or a rear engine rear drive (RR) type. The vehicle 10 according to the present embodiment is the vehicle of FF type. The power transmission device 16 transmits a power outputted from the engine 12 to the driven gear 28 via the transmission portion 24. The power transmission device 16 transmits a power outputted from the second electric motor MG2 to the driven gear 28 via the reduction gear 36. The power transmission device 16 transmits the power transmitted to the driven gear 28 to the pair of drive wheels 14 sequentially via the driven shaft 30, the final gear 32, the differential gear device 34 and the drive shafts 38, for example. The differential gear device 34 is a differential device that distributes the power transmitted via the final gear 32 to the pair of drive wheels 14.

The power transmission device 16 has a first axis CL1, a second axis CL2, a third axis CL3, and a fourth axis CL4, which are rotational center lines. These four axes CL1, CL2, CL3, CL4 are parallel to each other. The first axisCLI is an axis of the input shaft 22 and an axis of the rotor shaft of the first electric motor MG1. That is, the first axis CL1 is a rotational center line of the first electric motor MG1. The transmission portion 24 and the first electric motor MG1 are disposed around the first axis CL1. That is, in the transmission portion 24, the drive gear 26a is disposed coaxially with the first electric motor MG1. The second axis CL2 is an axis of the driven shaft 30. The driven gear 28 and the final gear 32 are disposed around the second axis CL2. That is, the second axial line CL2 is a rotational center line of each of the driven gear 28, the driven shaft 30 and the final gear 32. The third axis CL3 is an axis of the rotor shaft of the second electric motor MG2. That is, the third axis CL3 is a rotational center line of the second electric motor MG2. The second electric motor MG2 and the reduction gear 36 are disposed around the third axis CL3. The fourth axis CL4 is an axis of the drive shafts 38 and an axis of the differential gear device 34. That is, the fourth axis CL4 is a rotational center line of the differential gear device 34. The differential gear device 34 is disposed around the fourth axis CL4.

The transmission portion 24 includes the first electric motor MG1 and a differential mechanism 40. The differential mechanism 40 is constituted by a known single-pinion type planetary gear device, and includes a sun gear S, a carrier CA and a ring gear R. The sun gear S is connected to the rotor shaft of the first electric motor MG1, and the first electric motor MG1 is connected to the sun gear S in a power transmittable manner. The carrier CA is connected to the input shaft 22, and is connected to the engine 12, through the input shaft 22, for example, in a power transmittable manner. The ring gear R is formed on a part of an inner circumferential of the composite gear 26, and is integrally connected to the drive gear 26*a*.

The differential mechanism 40 is a differential mechanism which is connected to the engine 12 in a power transmittable manner and which generates a differential effect. The first electric motor MG1 is a differential electric motor that is connected to the differential mechanism 40 in a power transmittable manner. The differential mechanism 40 is a power dividing mechanism for mechanically dividing the power of the engine 12 between the first electric motor MG1 and the drive gear 26*a*. The transmission portion 24 is a known electric transmission mechanism in which the operating state of the first electric motor MG1 is controlled to control the operating state of the differential mechanism 40. The first electric motor MG1 may also function as a power source that outputs the power to the pair of drive wheels 14 via the differential mechanism 40.

Figure 2:
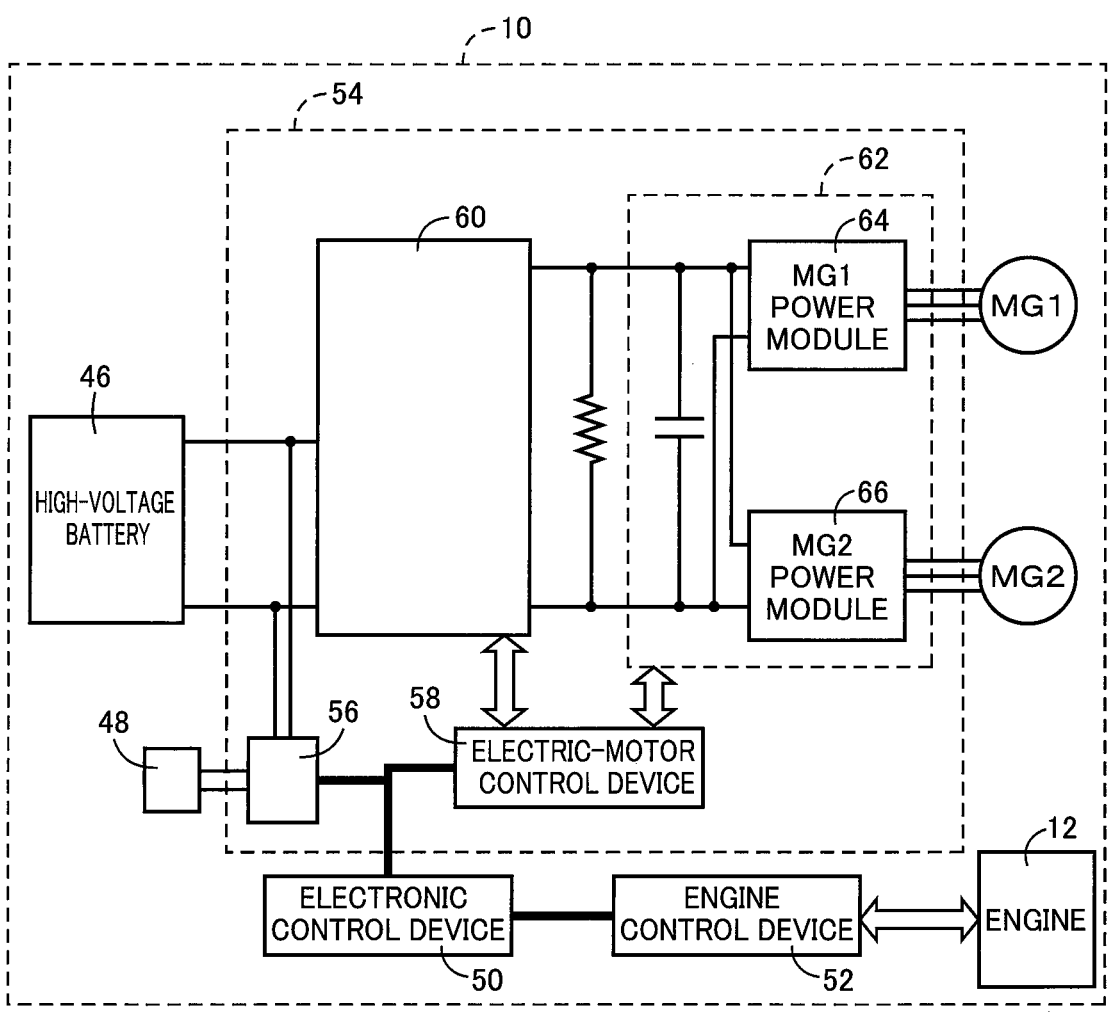

FIG. 2 is a view showing an example of an electrical configuration of an electric-power control unit 54 and the like.

The vehicle 10 further includes a high-voltage battery 46, an auxiliary battery 48 and the electric-power control unit 54.

The high-voltage battery 46 is a chargeable and dischargeable secondary battery such as a nickel-hydrogen secondary battery or a lithium ion battery. The high-voltage battery 46 is connected to the electric-power control unit 54. The high-voltage battery 46 is a battery for driving the first electric motor MG1 and the second electric motor MG2. For example, the stored electric power is supplied from the high-voltage battery 46 to the second electric motor MG2 via the electric-power control unit 54. Each of the first electric motor MG1 and the second electric motor MG2 generates an electric power by the power of the engine 12 and the driven force inputted from the pair of drive wheels 14, and the high-voltage battery 46 is charged with the generated electric power supplied via the electric-power control unit 54.

The auxiliary battery 48 is a chargeable and dischargeable secondary battery such as a lead storage battery. The auxiliary battery 48 has a charging voltage lower than that of the high-voltage battery 46. The auxiliary battery 48 is charged with the electric power generated by an alternator rotationally driven by the engine 12 or the electric power supplied from the high-voltage battery 46 via a DC-DC converter 56.

The electric-power control unit 54 includes the DC-DC converter 56, a boost converter 60, an inverter 62 and an electric-motor control device 58. The electric-power control unit 54 is an electric-power control device that controls the electric power transferred between the high-voltage battery 46 and each of the first electric motor MG1 and the second electric motor MG2, that is, the electric power transmitted and received by each of the first electric motor MG1 and the second electric motor MG2. The electric-power control unit 54 corresponds to an "electric-power control apparatus" in the present invention.

The DC-DC converter 56 is connected to the high-voltage battery 46. The DC-DC converter 56 functions as a charging device that reduces the voltage of the high-voltage battery 46 to a voltage equivalent to that of the auxiliary battery 48 and charges the auxiliary battery 48. The auxiliary battery 48 supplies the electric power for operating auxiliary devices provided in the vehicle 10. The auxiliary battery 48 supplies the electric power for operating, for example, an engine control device 52 and the electric-motor control device 58.

The boost converter 60 includes a reactor, a switching element and the like (not shown). The boost converter 60 is a buck-boost circuit having a function of increasing the voltage of the high-voltage battery 46 and supplying the increased voltage to the inverter 62, and a function of reducing the voltage converted into a direct current by the inverter 62 and supplying the reduced voltage to the high-voltage battery 46.

The inverter 62 includes an MG1 power module 64 and an MG2 power module 66. Each of the MG1 power module 64 and the MG2 power module 66 each include a switching element (not shown). The inverter 62 converts the direct current outputted from the boost converter 60 into an alternating current for driving the first electric motor MG1 and the second electric motor MG2. The inverter 62 converts the alternating current generated by the first electric motor MG1 and the alternating current generated by the second electric motor MG2 into the direct current. The inverter 62 uses the electric power generated by the first electric motor MG1 as the electric power for driving the second electric motor MG2 in accordance with a running state of the vehicle 10.

An electronic control device 50 transmits and receives signals to and from the DC-DC converter 56, the electric-motor control device 58 and the engine control device 52 via, for example, a known controller area network (CAN) communication line. The electronic control device 50 controls the running state of the vehicle 10 based on, for example, signals from sensors (not shown) or the like. The electronic control device 50 controls, for example, the DC-DC converter 56 to reduce the voltage of the high-voltage battery 46 to a voltage equivalent to that of the auxiliary battery 48. In the present embodiment, the electronic control device 50 and the engine control device 52 are control devices that are separate from the electric-power control unit 54, and particularly from the electric-motor control device 58.

The electric-motor control device 58 controls the first electric motor MG1 and the second electric motor MG2 based on a requested output value supplied from the electronic control device 50. For example, the electric-motor control device 58 controls the boost converter 60 and the inverter 62 to control an output of each of the first electric motor MG1 and the second electric motor MG2.

Returning back to FIG. 1, a transaxle 98 is a drive apparatus including a power transmission device 16 (including the transmission portion 24, the composite gear 26, the driven gear 28, the driven shaft 30 and the final gear 32), the first electric motor MG1 and the second electric motor MG2. A drive unit 96 is a mechanical-electrical integrated unit, i.e., a unit in which the transaxle 98 and the electric-power control unit 54 are integrally housed in the same casing 18. The meaning of the "same casing" will be described later. The transaxle 98 corresponds to a "drive apparatus" in the present invention, and the drive unit 96 corresponds to a "mechanical-electrical integrated unit" in the present invention.

Figure 3:
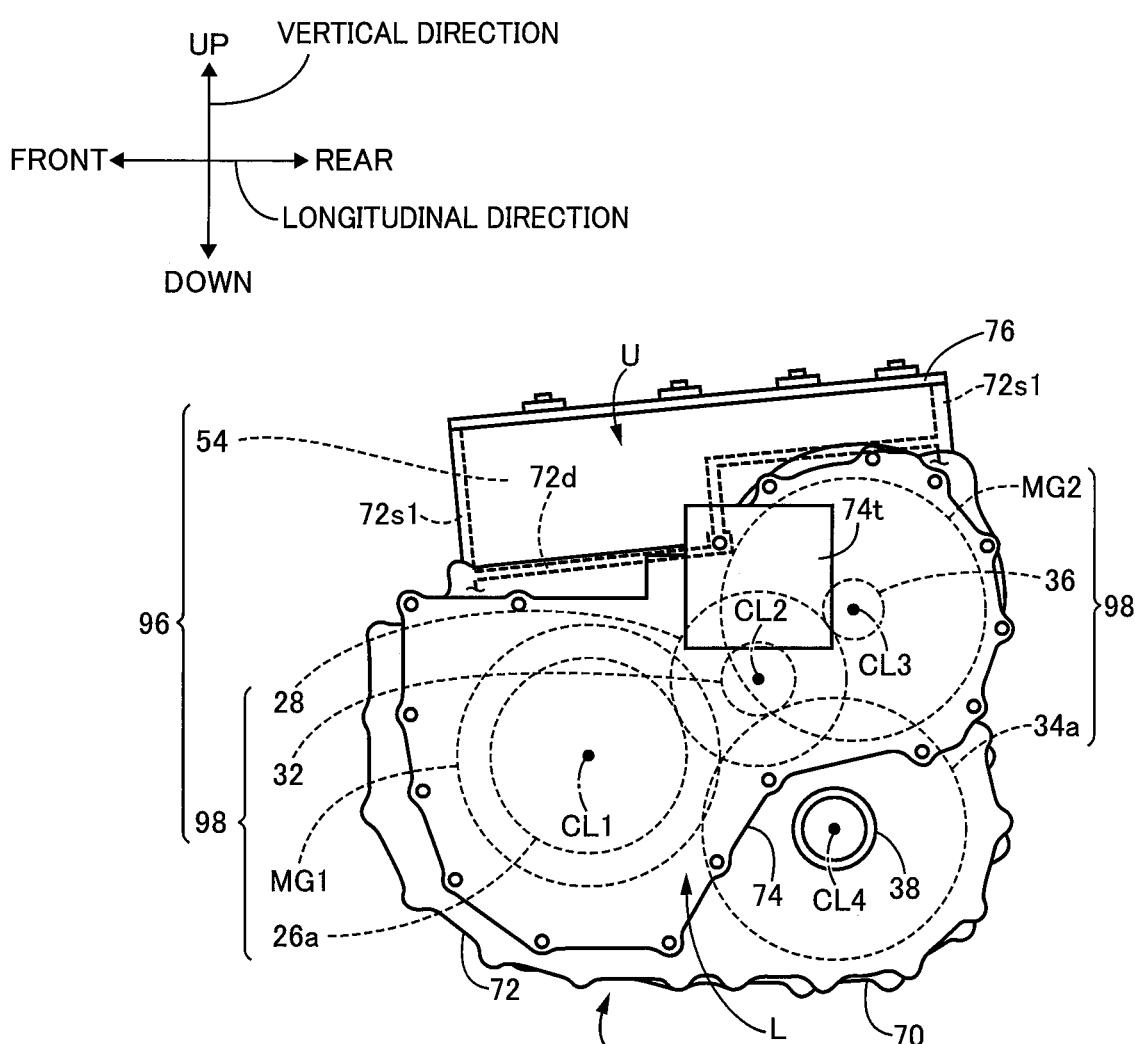
FIG. 3 is a view schematically showing an example of a construction of a drive unit.

FIG. 3 is a view schematically showing an example of a construction of the drive unit 96. Note that "VERTICAL DIRECTION", "LONGITUDINAL DIRECTION" and "WIDTH DIRECTION" shown in FIG. 3, FIG. 4A, FIG. 4B, and FIGS. 5 to 8 described later indicate directions in a state in which the drive unit 96 is installed in the vehicle 10. The "VERTICAL DIRECTION" is a vertical direction of the vehicle 10. The "LONGITUDINAL DIRECTION" is a longitudinal direction of the vehicle 10. The "WIDTH DIRECTION" is a width direction of the vehicle 10 and is a horizontal direction perpendicular to the longitudinal direction of the vehicle 10. The drive unit 96 is disposed in a position adjacent to the engine 12.

The casing 18 is made of, for example, a casting of an aluminum alloy. The casing 18 includes a first casing portion 70, a second casing portion 72, a third casing portion 74 and a fourth casing portion 76.

The first casing portion 70 is a bottomed cylindrical member. The second casing portion 72 is a bottomed cylindrical member, and is provided with a partition wall 72*d* inside thereof. The inside of the second casing portion 72 is divided into upper and lower portions by the partition wall 72*d*. The first casing portion 70 and the second casing portion 72 are integrally connected through fastening members such as bolts 78*a* (see FIG. 1) such that an opening portion of the first casing portion 70 and an engine-side portion of the second casing portion 72 are aligned. With the second casing portion 72 being connected with the first casing portion 70, the casing 18 has an upper space U and a lower space L that are vertically separated from each other by the partition wall 72*d*. The second casing portion 72 has an opening portion in its side wall that is one of sidewalls that define the lower space L, wherein the side wall is located on a opposite side to the engine 12. The second casing portion 72 has an opening portion in its upper surface that defines the upper space U. When being installed in the vehicle 10, the electric-power control unit 54 is accommodated in the upper space U, and the transaxle 98 is accommodated in the lower space L.

The upper space U and the lower space L are vertically separated by the partition wall 72*d*, and the side walls defining the upper space U and the side walls defining the lower space L are integrally formed as the second casing portion 72 by casting, for example. The partition wall 72*d* is a common partition wall 72*d* which defines the upper space U at its upper side portion and which defines the lower space L at its lower side portion. Therefore, where the upper space U and the lower space L are separated from each other in the second casing portion 72, at least one of the upper space U and the lower space L is necessarily exposed to the outside. The above-described "same casing" means a casing in which at least one of the upper space U and the lower space L is exposed to the outside where the upper space U and the lower space L are separated from each other as described above.

The third casing portion 74 is a plate-shaped member joined to the second casing portion 72 so as to cover the opening portion of the sidewall of the second casing portion 72. The second casing portion 72 and the third casing portion 74 are integrally connected to each other through fastening members such as bolts 78*b* (see FIG. 1).

The fourth casing portion 76 is a plate-shaped member joined to the second casing portion 72 so as to cover the opening portion of the upper surface of the second casing portion 72. The second casing portion 72 and the fourth casing portion 76 are integrally connected to each other through fastening members such as bolts 78*c* (see FIG. 1).

When being installed in the vehicle 10, the transaxle 98 is disposed such that, for example, each of the first axis CL1, the second axis CL2, the third axis CL3, and the fourth axis CL4 is parallel to the width direction of the vehicle 10, and such that the first axis CL1, the second axis CL2, the third axis CL3 and the fourth axis CL4 are located in respective positions which make the second electric motor MG2, the driven shaft 30, the first electric motor MG1 and the differential gear device 34 arranged in this order of description as seen from the upper side to the lower side in the vertical direction of the vehicle 10, and which make the first electric motor MG1, the driven shaft 30, the differential gear device 34 and the second electric motor MG2 arranged in this order of description as seen from the front side to the rear side in the longitudinal direction of the vehicle 10. Thus, the vertical size of the transaxle 98 is reduced while the distances between the first axis CL1, the second axis CL2, the third axis CL3, and the fourth axis CL4 are appropriately ensured.

In the upper space U, a pair of side walls 72*s*1 of the second casing portion 72 are opposed to each other in the longitudinal direction of the vehicle 10. In the upper space U, another pair of side walls 72*s*2 (see FIG. 4A and FIG. 4B) of the second casing portion 72 are opposed to each other in the width direction of the vehicle 10. As shown in FIG. 3, the upper space U is deeper in its portion on a side of the first electric motor MG1 than in its portion on a side of the second electric motor MG2, due to the arrangement of the first electric motor MG1 and the second electric motor MG2.

Figure 4A:
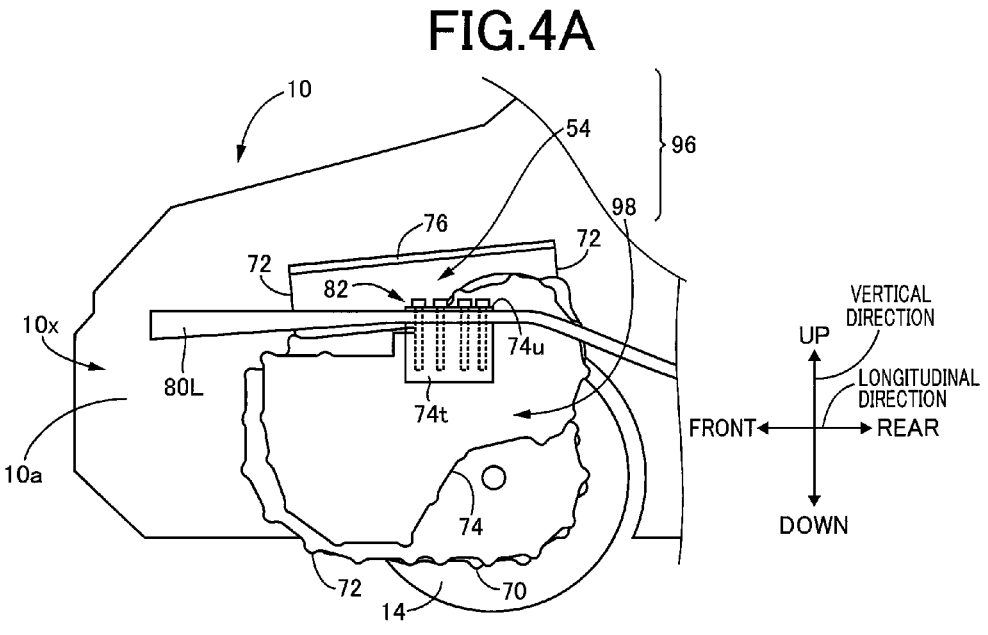
Figure 4B:
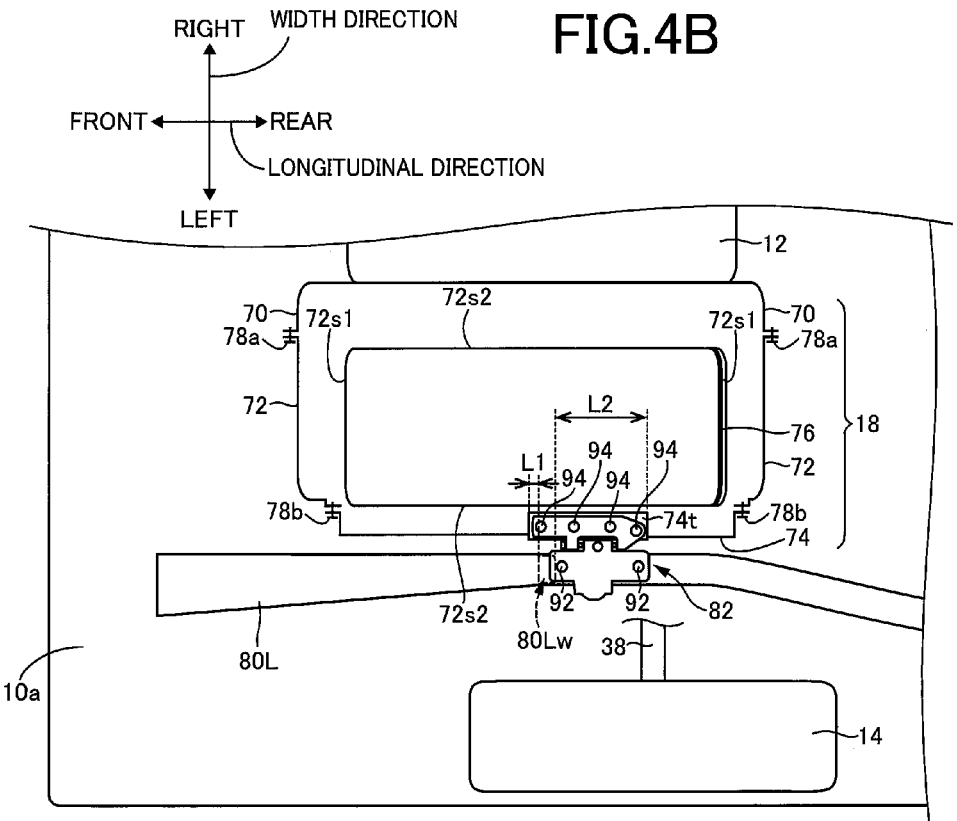

FIG. 4A and FIG. 4B are views showing an example of a state in which the drive unit 96 is installed in the vehicle 10, wherein FIG. 4A is a side view as seen from a left side of the vehicle 10, and FIG. 4B is a top view as seen from above the vehicle 10.

The drive unit 96 is housed in an engine compartment 10*x* together with the engine 12. The engine compartment 10*x* has the same meaning as an engine room that houses the engine 12.

Figure 8:
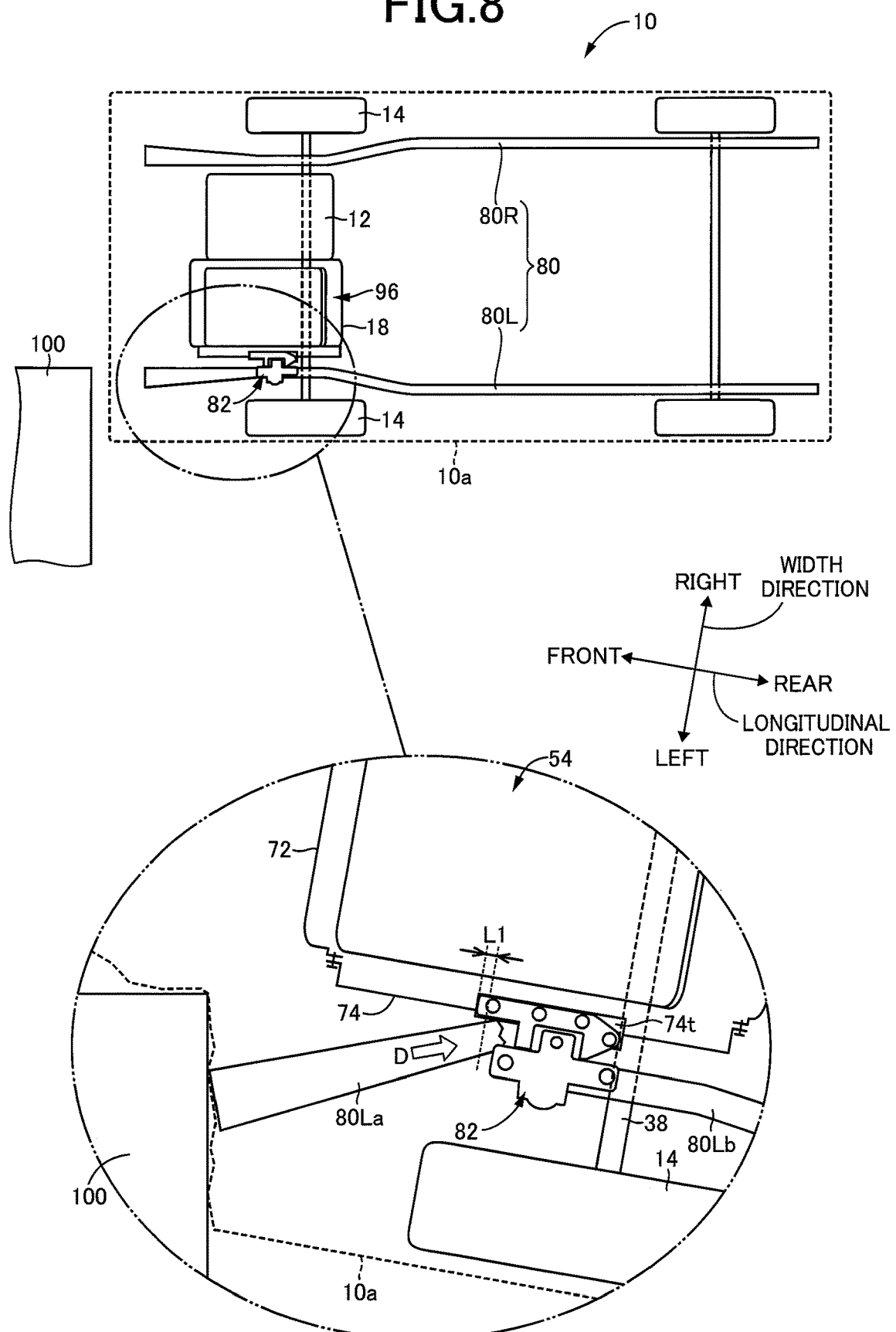
FIG. 8 is a view showing a state in which the left side member is broken by a frontal collision of the hybrid electric vehicle.

The vehicle 10 includes a pair of side members 80 (see FIG. 8). The pair of side members 80 includes a right side member 80R located on a right side in the width direction of the vehicle 10 and a left side member 80L located on a left side in the width direction of the vehicle 10. The left side member 80L and the right side member 80R are connected to each other through a cross member (not shown) (for example, a front cross member, a floor cross member, a rear cross member or the like).

A left-side portion of the drive unit 96 in the width direction is attached to the left side member 80L through a fastener 82. The fastener 82 is provided for attaching the drive unit 96 to the left side member 80L. The fastener 82 is connected to the left side member 80L through a plurality of fastening members such as bolts 92 and is connected to the drive unit 96 through a plurality of fastening members such as bolts 94. In the present embodiment, the bolts 92 consist of two bolts, and the bolts 94 consist of four bolts. The third casing portion 74 includes a fastened portion 74*t* to which the fastener 82 is attached through the fastening members. The fastened portion 74*t* is provided with a plurality of holes arranged in the longitudinal direction of the vehicle 10, so that the bolts 94 can be received in the holes, for example. The fastened portion 74*t* is a thick portion that is thicker than a surrounding portion surrounding the fastened portion 74*t*. Therefore, in the third casing portion 74, the fastened portion 74*t* has a higher strength [N/mm$^2$] than the surrounding portion surrounding the fastened portion 74*t*. The "strength" is a degree of load that an object can withstand. The third casing portion 74 corresponds to a "side wall of the casing" in the present invention.

A right-side portion of the drive unit 96 in the width direction is attached to a left-side portion of the engine 12 through a fastener (not shown). A right-side portion of the engine 12 in the width direction is attached to the right side member 80R. In this way, the left side member 80L supports the drive unit 96 through the fastener 82. The left side member 80L corresponds to a "side member" in the present invention. The fastener 82 corresponds to a "fastener" in the present invention.

The left side member 80L has a strength that is gradually reduced away from a front side toward a rear side until a fragile portion 80Lw (that is described later) in the longitudinal direction of the vehicle 10. For example, in the longitudinal direction, the left side member 80L is gradually narrowed away from the front side toward the rear side until the fragile portion 80Lw, and a fastening portion to which the fastener 82 is attached is relatively narrowed. The fastener 82 is attached to the left side member 80L, and thus the strength of the fastening portion to which the fastener 82 is attached is increased. Therefore, for example, in the longitudinal direction, the fragile portion 80Lw of the left side member 80L is located in a position on a front side of the fastening portion to which the fastener 82 is attached to the left side member 80L through the bolts 92. The position on the front side of the fastening portion corresponds to a "position outside" the fastening portion in the present invention. The fragile portion 80Lw is a portion of the left side member 80L that is most likely to be broken. The fragile portion 80Lw is provided to absorb collision energy by the left side member 80L being broken or bent in even of a frontal collision of the vehicle 10.

The fragile portion 80Lw is located in a position overlapping the fastened portion 74t as viewed in the width direction of the vehicle 10. That is, the fragile portion 80Lw and the fastened portion 74t have respective portions located in the same position in the vertical direction and the longitudinal direction of the vehicle 10. As shown in FIG. 4B, the fastened portion 74t extends to a position forward of the fragile portion 80Lw by a distance L1 [mm] and extends to a position rearward of the fragile portion 80Lw by a distance L2 [mm] in the longitudinal direction. In the longitudinal direction, a mount bracket 86 (see FIG. 5) of the fastener 82 is attached to the fastened portion 74t throughthe bolts 94, wherein a frontmost one of the bolts 94, which is located on a front side of the other bolts 94, is located on a front side of a mount insulator 84 (see FIG. 5) of the fastener 82 which is attached to the left side member 80L through the bolts 92.

Figure 5:
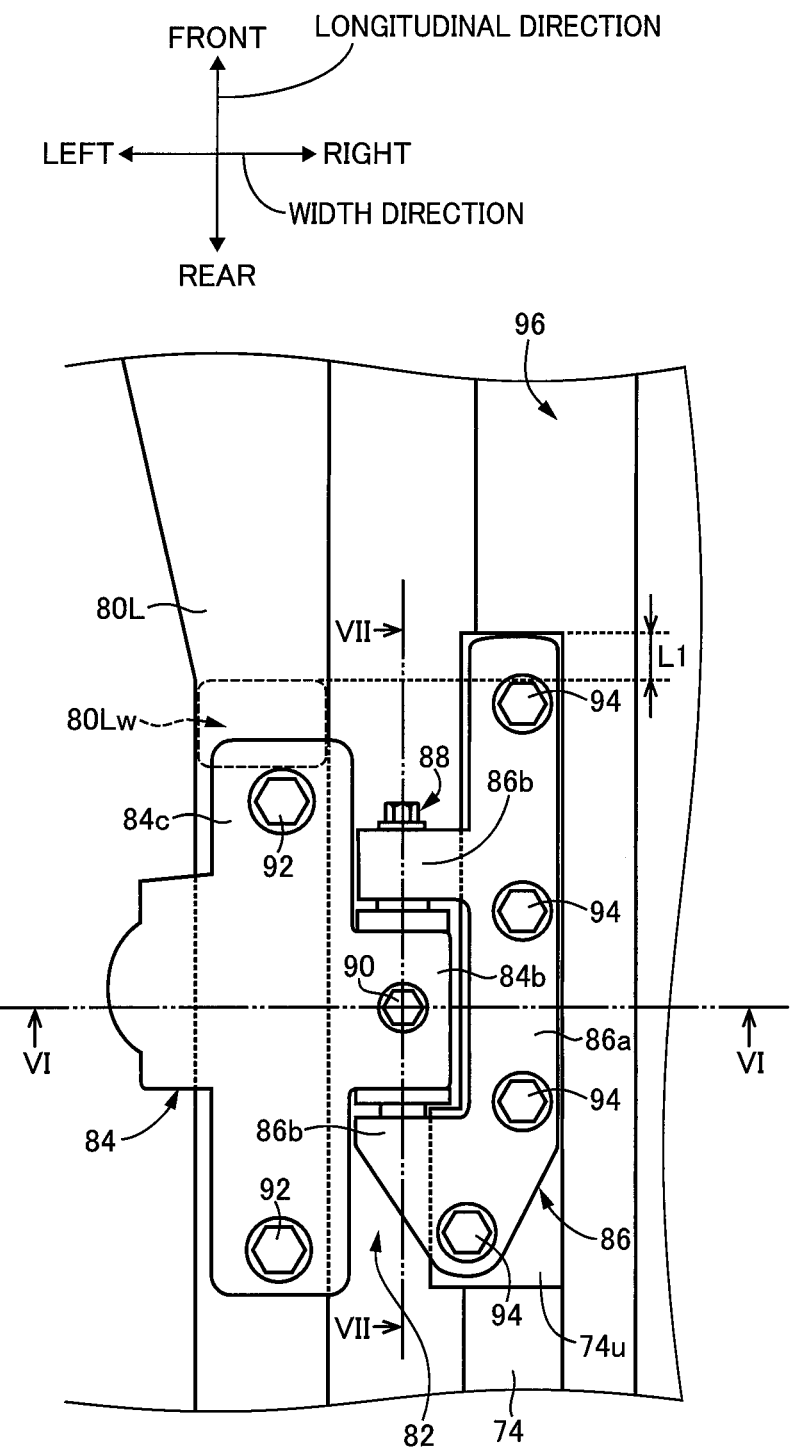
FIG. 5 is a view showing an example of a state in which the drive unit is attached to a left side member of the hybrid electric vehicle, and is a top view as seen from above the hybrid electric vehicle.
Figure 6:
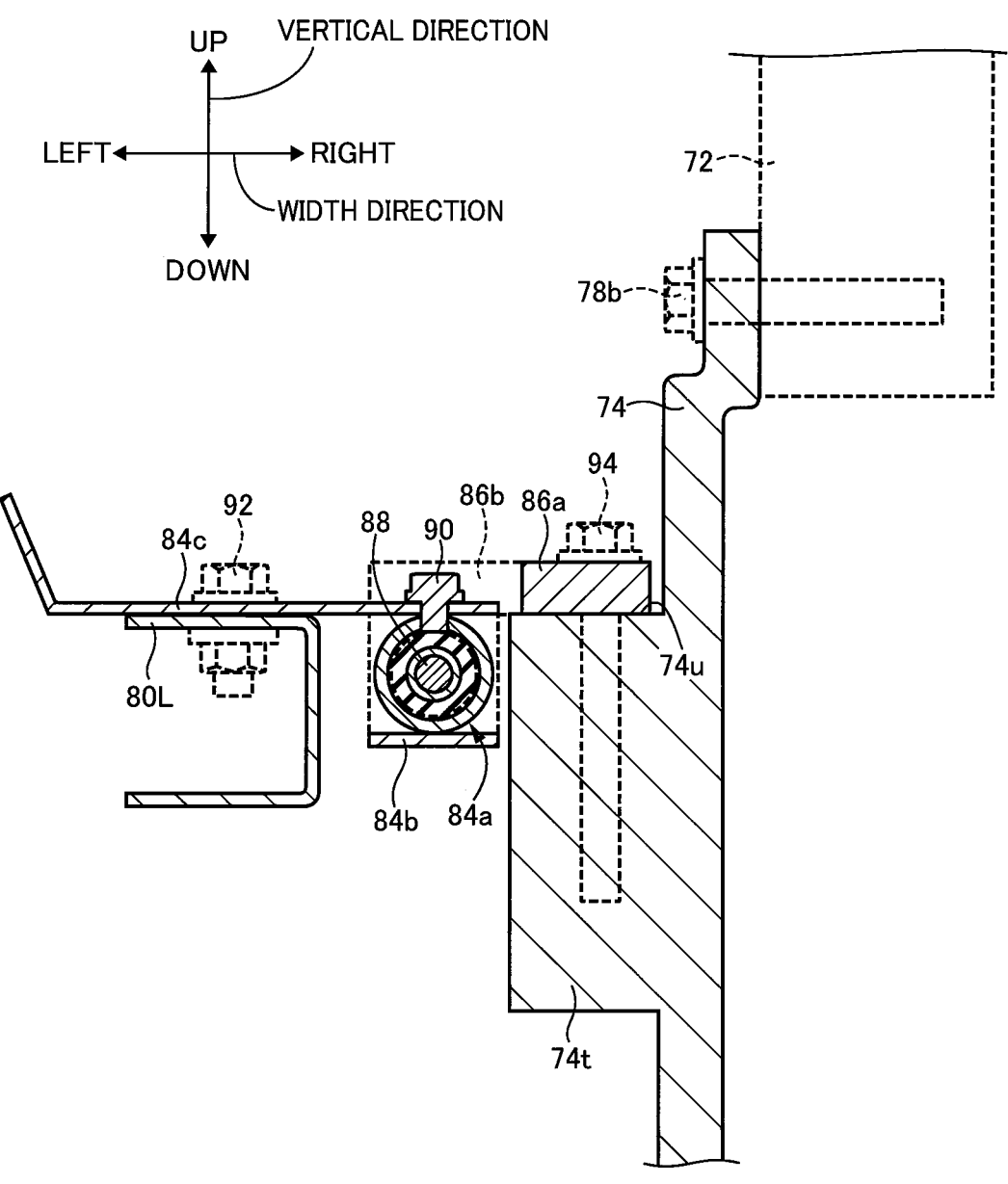
FIG. 6 is a view showing an example of the state in which the drive unit is attached to the left side member, and is a cross-sectional view taken along a line VI-VI shown in FIG. 5.
Figure 7:
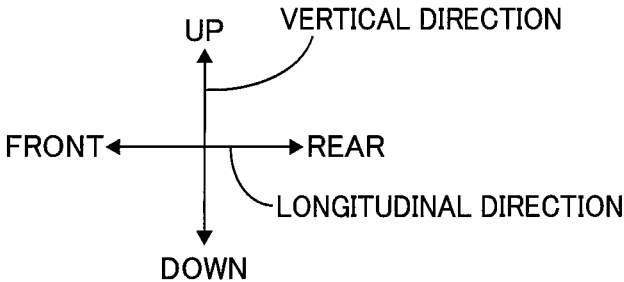
FIG. 7 is a view showing an example of the state in which the drive unit is attached to the left side member, and is a cross-sectional view taken along a line VII-VII shown in FIG. 5.
Figure 7:
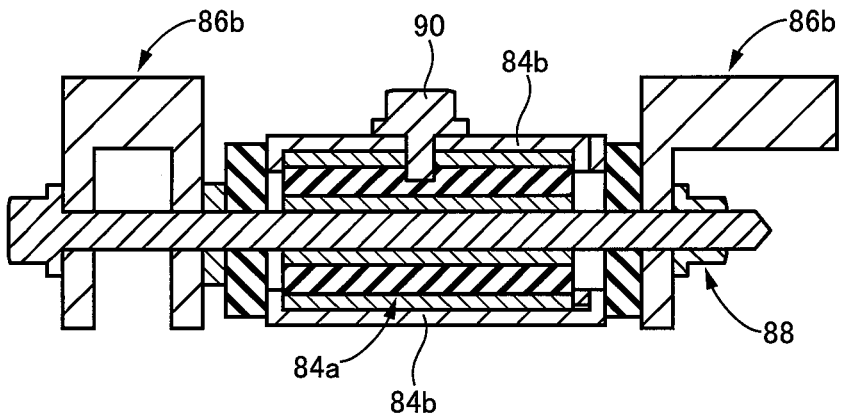

FIG. 5 is a view showing an example of a state in which the drive unit 96 is attached to the left side member 80L, and is a top view as seen from above the vehicle 10. FIG. 6 is a view showing an example of the state in which the drive unit 96 is attached to the left side member 80L, and is a cross-sectional view taken along a line VI-VI shown in FIG. 5. FIG. 7 is a view showing an example of the state in which the drive unit 96 is attached to the left side member 80L, and is a cross-sectional view taken along a line VII-VII shown in FIG. 5.

The fastener 82 includes the mount insulator 84, the mount bracket 86 and fastening members 88. The mount insulator 84 is a well-known insulator that performs functions such as heat insulation, vibration isolation, and various insulations for blocking heat, vibration, electricity and the like. The mount bracket 86 is a support member supporting the drive unit 96 that is attached to the left side member 80L.

For example, the mount insulator 84 includes an insulator portion 84a, a support portion 84b and an attached portion 84c. The insulator portion 84a is a portion including, for example, an outer-peripheral-side cylindrical portion made of metal, an inner-peripheral-side cylindrical portion made of metal and a rubber member, wherein the outer-peripheral-side cylindrical portion and the inner-peripheral-side cylindrical portion are disposed on a common axis, and the rubber member is disposed between the outer-peripheral-side cylindrical portion and the inner-peripheral-side cylindrical portion. The support portion 84b is a portion that supports the outer-peripheral-side cylindrical portion of the insulator portion 84a. The attached portion 84c is a plate-shaped portion attached to an upper surface of the left side member 80L. The support portion 84b and the attached portion 84c are formed by bending after press working, for example.

The mounting bracket 86 is made of, for example, a cast steel. The mount bracket 86 includes a first attached portion 86a and a second attached portion 86b. The first attached portion 86a is a plate-shaped portion attached to a fastening seat surface 74u which is an upper surface of the fastened portion 74t of the third casing portion 74. The second attached portion 86b is a portion that is connected to the insulator portion 84a of the mount insulator 84 through the fastening members 88. The mount bracket 86 and the mount insulator 84 are connected to each other through the fastening members 88 including, for example, a through-bolt and nuts. To be specific, the through-bolt inserted in holes provided in the second attached portion 86b and a hole provided in an inner peripheral side of the inner-peripheral-side cylindrical portion of the insulator portion 84a is fastened and fixed by the nuts.

The attached portion 84c of the mount insulator 84 is attached to the left side member 80L through the bolts 92. The first attached portion 86a of the mount bracket 86 is attached to the fastened portion 74t through the bolts 94. The support portion 84b of the mount insulator 84 is fixed to the outer-peripheral-side cylindrical portion of the insulator portion 84a through a bolt 90 so as not to be relatively movable.

FIG. 8 is a view showing a state in which the left side member 80L is broken due to a frontal collision of the vehicle 10 with a collision object 100. Although FIG. 8 illustrates a case where the left side member 80L is broken, the same applies to a case where the left side member 80L is bent. An upper stage of FIG. 8 shows a state before the frontal collision, and a lower stage of FIG. 8 shows a state immediately after the frontal collision. FIG. 8 shows a state of an offset collision in which a collision position with the collision object 100 is 25% of a front surface of the vehicle 10 on the left side, that is, a so-called small-overlap frontal collision.

The left side member 80L is broken at the fragile portion 80Lw due to the frontal collision. In the longitudinal direction, the left side member 80L is divided into a front side member 80La on the front side and a rear side member 80Lb on the rear side. A broken portion of the front side member 80La presses the casing 18 (in particular, a left-side one of the side walls 72s2 of the third casing portion 74 and the second casing portion 72) in a direction indicated by white arrow D. That is, the broken portion of the front side member 80La presses the casing 18 in the width direction of the vehicle 10. In the present embodiment, the fragile portion 80Lw is located in a position overlapping the fastened portion 74t as viewed in the widthwise direction of the vehicle 10, so that the front side member 80La presses the fastened portion 74t having a high strength in the third casing portion 74. Therefore, it is possible to reduce a load applied from the front side member 80La to the left-side one of the side walls 72s2 that define the upper space U in the second casing portion 72. That is, the second casing portion 72 is less likely to be broken by the broken front side member 80La.

According to the present embodiment, (a) the casing 18 has the upper space U and the lower space L that are vertically separated in the second casing portion 72, (b) the electric-power control unit 54 is housed in the upper space U while the transaxle 98 is housed in the lower space L, (c) the fastener 82 is attached to the fastened portion 74*t* which is provided in the third casing portion 74 and which is thicker than the surrounding portion surrounding the fastened portion 74*t*, and (d) the left side member 80Lw includes the fragile portion 80Lw that is located in the position overlapping the fastened portion 74*t* as viewed in the width direction of the vehicle 10. When the left side member 80L is broken at the fragile portion 80Lw due to a frontal collision of the vehicle 10, the left side member 80L presses the third casing portion 74 and the second casing portion 72 in the width direction so as to break through the third casing portion 74 and the second casing portion 72. However, in the present embodiment, the fragile portion 80Lw of the left side member 80L is located in the position overlapping the fastened portion 74*t* as viewed in the width direction, so that the strength of the portion of the casing pressed by the front side member 80La is increased by the fastened portion 74*t*, as compared to an arrangement in which the fragile portion 80Lw is not located in the position overlapping the fastened portion 74*t*. Thus, the second casing portion 72 is prevented from being pierced by the broken left side member 80L, and hence the electric-power control unit 54 applied with a high voltage is prevented from being exposed to the outside of the casing 18, due to breakage of the second casing portion 72, so that safety is easily ensured. The thick fastened portion 74*t* extends to a position on a front side of the fragile portion 80Lw in the longitudinal direction so that the fastened portion 74*t* overlaps the fragile portion 80Lw as viewed in the widthwise direction. In this way, a range of the thick fastened portion 74*t* is expanded in the longitudinal direction, and thus a rigidity of the third casing portion 74 having a plate shape is increased. Therefore, vibration noise generated from the third casing portion 74 is suppressed. The rigidity is a degree of difficulty in deformation of an object.

According to the present embodiment, the fragile portion 80Lw is located in the position on the front side of the fastening portion to which the fastener 82 (to be specific, the attached portion 84*c* of the mount insulator 84) is attached to the left side member 80L through the bolts 92, in the longitudinal direction. When the left side member 80L is broken at the fragile portion 80Lw, the drive unit 96 is kept supported by the rear side member 80Lb. The broken front side member 80La presses the fastened portion 74*t* having a high strength in the third casing portion 74. Therefore, the electric-power control unit 54 is prevented from being exposed to the outside of the casing 18, so that safety is easily secured.

According to the present embodiment, the strength of the left side member 80L is gradually reduced from the front side toward the rear side until the fragile portion 80L win the longitudinal direction. Thus, the fragile portion 80Lw is located on the front side of the fastening portion of the left side member 80L, to which the fastener 82 is attached, in the longitudinal direction.

According to the present embodiment, the mount bracket 86 of the fastener 82 is attached to the fastening portion 80L through the bolts 94 in a position forward of the position at which the mount insulator 84 of the fastener 82 is attached to the left side member 74*t* through the bolt 92 in the longitudinal direction. That is, the fastened portion 74*t* of the third casing portion 74 of the casing 18 is located in a position closer to a front end of the vehicle 10, than a position of the fastening portion of the left side member 80L, in the longitudinal direction. In case of such an arrangement, a maximum distance between positions of the plurality of bolts 94 in the longitudinal direction is longer than in case without such an arrangement. For example, where the maximum distance between the positions of the plurality of bolts 94 is long, even if a vibration load is applied to the plurality of bolts 94 from the drive shafts 38, it is possible to suppress radial slippage between an internal thread and an external thread that is provided by each of the bolts 94, and accordingly suppress the drive unit 96 from being displaced with respect to the fastener 82.

Although the embodiment of the present invention has been described in detail with reference to the drawings, the present invention is also applicable to other forms.

In the above-described embodiment, the vehicle 10 includes the engine 12, the first electric motor MG1 and the second electric motor MG2 as the power sources. However, the present invention is not limited thereto. For example, the present invention is applicable to a vehicle that does not include the engine 12 but includes only an electric motor as a power source, that is, an electric vehicle.

In the above-described embodiment, both the first electric motor MG1 and the second electric motor MG2 are motor generators, but the present invention is not limited thereto. For example, the first electric motor MG1 may be a rotary electric machine that does not have a motor function as long as it has a power generator function. For example, the second electric motor MG2 may be a rotary electric machine that does not have a power generator function as long as it has a motor function.

In the above-described embodiment, the transaxle 98 includes two motors, i.e., the first electric motor MG1 and the second electric motor MG2. However, the present invention is not limited thereto. The transaxle 98 may include one electric motor or three or more electric motors. For example, the vehicle 10 may be an electric vehicle provided with only the second electric motor MG2 as the power source without the first electric motor MG1.

In the above-described embodiment, the vehicle 10 is an FF vehicle, but the present invention is not limited thereto. For example, the present invention can be applied to an RR vehicle in which the arrangement of the drive unit 96 and the left side member 80L in the longitudinal direction is reversed from that in the embodiment, such that the fragile portion 80Lw of the left side member 80L is located in a position on a rear side of the fastening portion to which the fastener 82 is attached to the left side member 80L through the bolts 92. In this case, the position on the rear side of the fastening portion corresponds to a "position outside" the fastening portion in the present invention, and a rear end of the vehicle 10 corresponds to an "outer end" of the vehicle 10 in the present invention. In this case, even if the left side member 80L is bent or broken at the fragile portion 80Lw due to a rear collision of the vehicle 10, the electric-power control unit 54 is prevented from being exposed to the outside of the casing 18, and thus safety is easily ensured.

In the above-described embodiment, the drive unit 96 is attached to the left side member 80L through the fastener 82, but the present invention is not limited thereto. For example, the present invention can be applied to an arrangement in which the drive unit 96 is attached to the right side member 80R through the fastener 82. In this arrangement, the right side member 80R corresponds to the "side member" in the present invention.

In the above-described embodiment, when being installed in the vehicle 10, the transaxle 98 is disposed such that the first axis CL1, the second axis CL2, the third axis CL3 and the fourth axis CL4 are located in respective positions which make the second electric motor MG2, the driven shaft 30, the first electric motor MG1 and the differential gear device 34 arranged in this order of description as seen from the upper side to the lower side in the vertical direction of the vehicle 10, and which make the first electric motor MG1, the driven shaft 30, the differential gear device 34 and the second electric motor MG2 arranged in this order of description as seen from the front side to the rear side in the longitudinal direction of the vehicle 10. However, the present invention is not limited thereto. For example, when being installed in the vehicle 10, the transaxle 98 may be disposed such that the first axis CL1, the second axis CL2, the third axis CL3 and the fourth axis CL4 are located in respective positions which make the second electric motor MG2, the differential gear device 34, the driven shaft 30 and the first electric motor MG1 arranged in this order of description as seen from the front side to the rear side in the longitudinal direction of the vehicle 10.

In the above-described embodiment, the electronic control device 50, the electric-motor control device 58 for controlling the first electric motor MG1 and the second electric motor MG2, and the engine control device 52 for controlling the engine 12 are respective units separated from each other. However, these devices may be constituted by a single control unit. The present invention may be embodied such that the electronic control device 50, the electric-motor control device 58 and the engine control device 52 are functionally divided control units, as required.

The above description is merely one embodiment, and the present invention can be implemented in a mode in which various modifications and improvements are added based on the knowledge of those skilled in the art.

NOMENCLATURE OF ELEMENTS

10: hybrid electric vehicle (electric vehicle)
18: casing
54: electric-power control unit (electric-power control apparatus)
72$d$: partition wall
74: third casing portion (side wall of casing)
74$t$: fastened portion
80L: left side member (side member)
80Lw: fragile portion
82: fastener (fastener)
96: drive unit (mechanical-electrical integrated unit)
98: transaxle (drive apparatus)
L: lower space
MG1: first electric motor (electric motor)

MG2: second electric motor (electric motor)
U: upper space

What is claimed is:

1. An electric vehicle, the electric vehicle comprising:
a side member;
a casing, wherein the casing has an upper space and a lower space that are vertically separated within the casing; and
a mechanical-electrical integrated unit attached to the side member through a fastener, wherein the mechanical-electrical integrated unit is constituted by a drive apparatus and an electric-power control apparatus that are housed in the casing, wherein the drive apparatus includes an electric motor functioning as a power source, wherein the electric-power control apparatus is configured to control an electric power transmitted and received by the electric motor,
wherein the electric-power control apparatus is housed in the upper space of the casing and the drive apparatus is housed in the lower space of the casing,
wherein the fastener is attached to a fastened portion which is provided in a side wall of the casing, wherein the fastened portion is thicker than a surrounding portion of the sidewall of the casing which surrounds the fastened portion, and
wherein the side member includes a fragile portion that is located on the side member at a position overlapping the fastened portion of the side wall of the casing as viewed in a width direction of the electric vehicle.

2. The electric vehicle according to claim 1,
wherein the side member includes a fastening portion to which the fastener is attached, and
wherein the fragile portion is located in a position outside the fastening portion in a longitudinal direction of the electric vehicle.

3. The electric vehicle according to claim 2,
wherein the side member has a strength that is gradually reduced away from an outer side toward an inner side until the fragile portion in the longitudinal direction of the electric vehicle.

4. The electric vehicle according to claim 3,
wherein the fastened portion of the side wall of the casing is located in a position closer to an outer end of the electric vehicle, than a position of the fastening portion of the side member, in the longitudinal direction of the electric vehicle.

* * * * *